(12) United States Patent
Shibata et al.

(10) Patent No.: US 7,705,089 B2
(45) Date of Patent: Apr. 27, 2010

(54) RUBBER-MODIFIED STYRENE RESIN COMPOSITION

(75) Inventors: Takao Shibata, Himeji (JP); Akira Takaki, Kobe (JP); Kazunori Saegusa, Kobe (JP)

(73) Assignee: Kaneka Corporation, Osaka (JP)

( * ) Notice: Subject to any disclaimer, the term of this patent is extended or adjusted under 35 U.S.C. 154(b) by 278 days.

(21) Appl. No.: 10/559,666

(22) PCT Filed: May 28, 2004

(86) PCT No.: PCT/JP2004/007795

§ 371 (c)(1),
(2), (4) Date: Dec. 5, 2005

(87) PCT Pub. No.: WO2004/111125

PCT Pub. Date: Dec. 23, 2004

(65) Prior Publication Data

US 2006/0135692 A1    Jun. 22, 2006

(30) Foreign Application Priority Data

Jun. 12, 2003  (JP) .............................. 2003-168261
Jul. 8, 2003   (JP) .............................. 2003-193321

(51) Int. Cl.
*C08L 51/04*  (2006.01)
*C08L 83/10*  (2006.01)

(52) U.S. Cl. .............................. 525/63; 525/64; 525/69; 525/71

(58) Field of Classification Search ............. 525/63, 525/64, 69, 71
See application file for complete search history.

(56) References Cited

U.S. PATENT DOCUMENTS

| 4,690,986 A | 9/1987 | Sasaki et al. |
| 5,773,532 A | 6/1998 | Okaniwa et al. |
| 2003/0092819 A1* | 5/2003 | Miyatake et al. ............ 524/457 |

FOREIGN PATENT DOCUMENTS

| JP | 07-331025 | * | 12/1995 |
| JP | 2000-119477 A | | 4/2000 |
| JP | 2000-264935 A | | 9/2000 |
| JP | 2001-106863 A | | 4/2001 |
| JP | 2001-278927 A | | 10/2001 |
| JP | 2002-20574 A | | 1/2002 |

OTHER PUBLICATIONS

Maeda, electronic translation of JP 07-331025, Dec. 1995.*

* cited by examiner

*Primary Examiner*—Jeffrey C Mullis
(74) *Attorney, Agent, or Firm*—Sughrue Mion, PLLC

(57) ABSTRACT

A rubber-modified styrene resin composition having excellent impact resistance, high tensile strength, and good moldability is provided. The present invention is accomplished by a rubber-modified styrene resin composition containing 99.9 to 97 percent by weight of a rubber-modified styrene resin (E) and 0.1 to 3 percent by weight of a polyorganosiloxane-containing graft copolymer (D), the polyorganosiloxane-containing graft copolymer (D) being a specific copolymer prepared with a polyorganosiloxane (A) produced by polymerizing 99.9 to 99.6 percent by weight of a organosiloxane with 0.1 to 0.4 percent by weight of a graft-linking agent.

3 Claims, No Drawings

RUBBER-MODIFIED STYRENE RESIN COMPOSITION

RELATED APPLICATION

This application is a national stage of International Application No. PCT/JP2004/007795 filed on May 28, 2004, claiming priorities based on Japanese Application No. 2003-168261 filed on Jun. 12, 2003 and Japanese Application No. 2003-193321 filed on Jul. 8, 2003.

TECHNICAL FIELD

The present invention relates to a polyorganosiloxane-containing graft copolymer that has excellent powder properties and that significantly improves impact resistance of a rubber-modified styrene resin, and relates to a rubber-modified styrene resin composition containing a small amount of the graft copolymer.

BACKGROUND ART

Rubber-modified styrene resins, in particular, acrylonitrile butadiene styrene (ABS) resins have excellent impact resistance, high heat resistance, high stiffness, good moldability, and the like. Hence, the ABS resins have been widely used for sundries, automotive interior and exterior components, housings and components for household electrical appliances such as electric rice cookers and microwave ovens, and housings and components for office automation (OA) equipment such as telephones and facsimiles.

In recent years, to improve weather resistance, a shortcoming, of ABS resins, acrylonitrile acrylic styrene (AAS) resins have been developed by substituting acrylic rubbers having few double bonds for butadiene rubbers having double bonds that are unstable to light and heat, in the rubber components of the ABS resins. Unfortunately, acrylic rubbers exhibit lower impact resistance than butadiene rubbers.

A method for adding an organic silicone oil to improve the impact resistance of the AAS resin or the ABS resin is disclosed in Japanese Unexamined Patent Application Publication No. 2001-31830. However, in the conventional method for adding the organic silicone oil, an addition of a large amount of the silicone oil causes a problem in which a molded product has an undesired surface.

A method for adding a polyorganosiloxane-containing graft copolymer in order to improve secondary processability of the rubber-modified styrene resin is disclosed in Japanese Unexamined Patent Application Publication No. 7-331025. However, when the polyorganosiloxane content in the polyorganosiloxane-containing graft copolymer is high, it is difficult to process the graft copolymer into a powder form. Furthermore, when the polyorganosiloxane-containing graft copolymer is added to the rubber-modified styrene resin, a problem arises in that the resulting resin has an undesired appearance and low impact resistance.

DISCLOSURE OF THE INVENTION

The present invention provides a rubber-modified styrene resin composition having excellent impact resistance and high tensile strength to solve above-described problems caused by adding a silicone oil or a polyorganosiloxane-containing graft copolymer.

The present invention was accomplished by finding excellent powder properties of a polyorganosiloxane-containing graft copolymer with a specific composition and finding improved surface properties and impact resistance of a molded product of a rubber-modified styrene resin composition prepared by blending a rubber-modified styrene resin and a small amount of the polyorganosiloxane-containing graft copolymer.

That is, the rubber-modified styrene resin composition containing 99.9 to 97 percent by weight of a rubber-modified styrene resin (E) and 0.1 to 3 percent by weight of a polyorganosiloxane-containing graft copolymer (D), the polyorganosiloxane-containing graft copolymer (D) being one selected from the group consisting of a copolymer (a-1) and a copolymer (a-2), the copolymer (a-1) and the copolymer (a-2) being prepared with a polyorganosiloxane (A) produced by polymerizing 99.9 to 99.6 percent by weight of an organosiloxane with 0.1 to 0.4 percent by weight of a graft-linking agent; the copolymer (a-1) being prepared by polymerizing 0.01 to 5 parts by weight of a monomer (B) containing 100 to 50 percent by weight of a polyfunctional monomer (b-1) having at least two intermolecular polymerizable unsaturated bonds and 0 to 50 percent by weight of another copolymerizable monomer (b-2) in the presence of 86 to 94.99 parts by weight of the polyorganosiloxane (A), and then polymerizing the resulting polymer with 5 to 13.99 parts by weight of a vinyl monomer (C), wherein the sum of the compounds (A), (B), and (C) is 100 parts by weight; the copolymer (a-2) being prepared by polymerizing 27.5 to 14 parts by weight of a vinyl monomer (C) in the presence of not less than 72.5 and less than 86 parts by weight of the polyorganosiloxane (A), wherein the sum of the compounds (A) and (C) is 100 parts by weight.

In a preferred embodiment of the rubber-modified styrene resin composition, the polyorganosiloxane-containing graft copolymer (D) is the copolymer (a-1) prepared with the polyorganosiloxane (A) produced by polymerizing 99.9 to 99.6 percent by weight of the organosiloxane with 0.1 to 0.4 percent by weight of the graft-linking agent.

In a preferred embodiment of the rubber-modified styrene resin composition, the polyorganosiloxane-containing graft copolymer (D) is the copolymer (a-2) prepared with the polyorganosiloxane (A) produced by polymerizing 99.9 to 99.6 percent by weight of the organosiloxane with 0.1 to 0.4 percent by weight of the graft-linking agent.

In a preferred embodiment of the rubber-modified styrene resin composition, the rubber-modified styrene resin contains 99.9 to 99.1 percent by weight of the rubber-modified styrene resin (E) and 0.1 to 0.9 percent by weight of the polyorganosiloxane-containing graft copolymer (D).

In a preferred embodiment of the rubber-modified styrene resin composition, each of the vinyl monomers (b-2) and (C) is at least one selected from the group of an aromatic vinyl monomer, a cyanovinyl monomer, a (meth)acrylate monomer, a vinyl monomer with a carboxyl group, and a maleimide monomer, the vinyl monomers (b-2) and (C) being used for preparing the polyorganosiloxane-containing graft copolymer (D).

BEST MODE FOR CARRYING OUT THE INVENTION

A polyorganosiloxane-containing graft copolymer (D) of the present invention is a copolymer (a-1) prepared by polymerizing 0.01 to 5 parts by weight of a monomer (B) containing 100 to 50 percent by weight of a polyfunctional monomer (b-1) having at least two intermolecular polymerizable unsaturated bonds and 0 to 50 percent by weight of another copolymerizable monomer (b-2) in the presence of 86 to 94.99 parts by weight of the polyorganosiloxane (A), and then polymerizing the resulting polymer with 5 to 13.99 parts by weight of a vinyl monomer (C), wherein the sum of the compounds (A), (B), and (C) is 100 parts by weight; or a copolymer (a-2) prepared by polymerizing 27.5 to 14 parts by weight of a vinyl monomer (C) in the presence of not less than 72.5 and less than 86 parts by weight of the polyorganosiloxane (A), wherein the sum of the compounds (A) and (C) is 100 parts by weight.

The polyorganosiloxane (A) of the present invention is prepared by polymerizing an organosiloxane.

The organosiloxane of the present invention has a unit represented by the general formula $R_mSiO_{(4-m)/2}$, where R is a substituted or unsubstituted monovalent hydrocarbon radical; and m is an integer between 0 and 3. The organosiloxane preferably has a linear, branched, or cyclic structure, more preferably, a cyclic structure. This substituted or unsubstituted monovalent hydrocarbon radical includes, for example, methyl, ethyl, propyl, and phenyl, which are optionally substituted by, for example, cyano.

Examples of organosiloxane include the cyclic compounds, for example, hexamethylcyclotrisiloxane (D3), octamethylcyclotetrasiloxane (D4), decatylcyclopentasiloxane (D5), dodecamethylcyclohexasiloxane (D6), and trimethyltriphenylcyclotrisiloxane, in addition, linear or branched organosiloxanes. These organosiloxanes may be used alone or in combination.

In the polymerization of the polyorganosiloxane (A) of the present invention, a graft-linking agent is used, and a cross-linking agent may be used, if necessary.

The graft-linking agents of the present invention include, for example, p-vinylphenylmethyldimethoxysilane, p-vinylphenylethyldimethoxysilane, 2-(p-vinylphenyl)ethylmethyldimethoxysilane, 3-(p-vinylbenzoyloxy)propylmethyldimethoxysilane, p-vinylphenylmethyldimethoxysilane, vinylmethyldimethoxysilane, tetravinyltetramethylcyclosiloxane, allylmethyldimethoxysilane, γ-mercaptopropylmethyldimethoxysilane, and γ-methacryloxypropylmethyldimethoxysilane.

The amount of the graft-linking agent used is 0.1 to 0.4 percent by weight, preferably 0.1 to 0.35 percent by weight, and more preferably 0.15 to 0.3 percent by weight, based upon 100 percent by weight of the total of the organosiloxane and the graft-linking agent. In the use of less than 0.1 percent by weight of the graft-linking agent, it tends to be difficult to produce the polyorganosiloxane-containing graft copolymer (D) in the form of powder, while in the use of more than 0.4 percent by weight of the graft-linking agent, it tends to decrease the impact resistance of a complete molded product.

The cross-linking agents of the present invention include, for example, trifunctional cross-linking agents such as methyltrimethoxysilane, phenyltrimethoxysilane, and ethyltriethoxysilane, tetrafunctional cross-linking agents such as tetraethoxysilane, 1,3-bis[2-(dimethoxymethylsilyl)ethyl] benzene, 1,4-bis[2-(dimethoxymethylsilyl)ethyl]benzene, 1,3-bis[1-(dimethoxymethylsilyl)ethyl]benzene, 1-[1-(dimethoxymethylsilyl)ethyl]-3-[2-(dimethoxymethylsilyl) ethyl]benzene, and 1-[1-(dimethoxymethylsilyl)ethyl]-4-[2-(dimethoxymethylsilyl)ethyl]benzene. These cross-linking agents may be used alone or in combination. The amount of the addition of the cross-linking agent is not more than 10 percent by weight, preferably not more than 3 percent by weight relative to the weight of the polyorganosiloxane (A). In the case of more than 10 percent by weight, since the flexibility of the polyorganosiloxane (A) is impaired, the effect of improving the impact resistance of a complete molded product tends to decrease.

The average particle size of the polyorganosiloxane (A) of the present invention is preferably 0.008 to 0.6 μm, more preferably 0.01 to 0.3 μm. In the average particle size of less than 0.008 μm, the latex of the polyorganosiloxane (A) is difficult to be stably manufactured, while in the average particle size of more than 0.6 μm, the effect of improving the impact resistance of a complete molded product tends to decrease.

The polyorganosiloxane (A) is preferably prepared by a method in which U.S. Pat. Nos. 2,891,920 and 3,294,725 disclose the following: an organosiloxane and a graft-linking agent are emulsified and dispersed in water by high-speed shearing with a high-speed stirrer such as a homogenizer in the presence of an emulsifier such as alkylbenzenesulfonic acid, followed by an emulsion polymerization. The alkylbenzenesulfonic acid is preferable because it functions as an emulsifier for the polyorganosiloxane and also functions as a polymerization initiator. The amount of the emulsifier used is preferably 0.1 to 5 percent by weight, more preferably 0.3 to 3 percent by weight relative to the total weight of the organosiloxane and the graft-linking agent. The polymerization temperature is usually 5° C. to 100° C.

The amount of the polyorganosiloxane (A) in the polyorganosiloxane-containing graft copolymer (D) of the present invention is 72.5 to 95 parts by weight. In the case of less than 72.5 parts by weight of the polyorganosiloxane (A), the effect of improving the impact resistance of a complete molded product tends to decrease, while in the case of more than 95 parts by weight, it tends to be difficult to produce the polyorganosiloxane-containing graft copolymer (D) in the form of powder.

When the polyorganosiloxane (A) in the polyorganosiloxane-containing graft copolymer (D) is 86 to 94.99 parts by weight, in order to produce the polyorganosiloxane-containing graft copolymer (D) in the form of powder, it is necessary to polymerize 0.01 to 5 parts by weight of the monomer (B) and then to polymerize the resulting polymer with 5 to 13.99 parts by weight of a vinyl monomer (C). The monomer (B) comprises 100 to 50 percent by weight, preferably 100 to 80 percent by weight of a polyfunctional monomer (b-1) having at least two intermolecular polymerizable unsaturated bonds and 0 to 50 percent by weight, preferably 0 to 20 percent by weight of another copolymerizable monomer (b-2). In the case of less than 50 percent by weight of the polyfunctional monomer (b-1), the effect of improving the impact resistance of a complete molded product tends to decrease, and it tends to be difficult to produce the polyorganosiloxane-containing graft copolymer (D) in the form of powder. In the case of less than 0.01 parts by weight of the monomer (B), it also tends to be difficult to produce the polyorganosiloxane-containing graft copolymer (D) in the form of powder, while in the case of more than 5 parts by weight of the monomer (B), the effect of improving the impact resistance of a complete molded product tends to decrease.

Examples of the polyfunctional monomers (b-1) include, for example, allyl methacrylate, ethylene glycol dimethacrylate, 1,3-butylene glycol dimethacrylate, and divinylbenzene. These compounds may be used alone or in combination.

Examples of the other copolymerizable monomers (b-2) include, for example, (i) aromatic vinyl monomers such as styrene, α-methylstyrene, p-methylstyrene, p-butylstyrene, chlorostyrene, and bromostyrene; (ii) cyanovinyl monomers such as acrylonitrile and methacrylonitrile; (iii) (meth)acrylic ester monomers such as methyl acrylate, ethyl acrylate, propyl acrylate, butyl acrylate, 2-ethylhexyl acrylate, glycidyl acrylate, hydroxyethyl acrylate, methyl methacrylate, ethyl methacrylate, butyl methacrylate, lauryl methacrylate, glycidyl methacrylate, and hydroxyethyl methacrylate; (iv) vinyl monomers with at least one carboxyl group such as itaconic acid, (meth)acrylic acid, fumaric acid, and maleic acid; and (v) maleimide monomers such as maleimide, N-methylmaleimide, N-ethylmaleimide, N-propylmaleimide, N-butylmaleimide, N-phenylmaleimide, and N-(p-methylphenyl)maleimide. These compounds may be used alone or in combination.

In the case of not less than 72.5 and less than 86 parts by weight of the polyorganosiloxane (A) in the polyorganosiloxane-containing graft copolymer (D) of the present invention, the polyorganosiloxane-containing graft copolymer (D) having a powder form is produced by polymerizing the polyorganosiloxane (A) with 27.5 to 14 parts by weight of the vinyl monomer (C) in the absence of the monomer (B).

The vinyl monomer (C) in the polyorganosiloxane-containing graft copolymer (D) of the present invention is used for ensuring the compatibility between the polyorganosiloxane-containing graft copolymer (D) and the rubber-modified styrene resin (E) and for homogeneously dispersing the polyorganosiloxane-containing graft copolymer (D) into the rubber-modified styrene resin (E). Examples of the vinyl monomers (C) include the same compounds as the examples of the copolymerizable monomer (b-2) in the vinyl monomer (B).

The polymerization of the monomer (B) in the presence of the polyorganosiloxane (A) and the graft polymerization of the resulting polymer with the vinyl monomer (C) in preparing the polyorganosiloxane-containing graft copolymer (D) are accomplished by a typical emulsion polymerization.

A method for isolating the polymer from the latex of the graft copolymer (D) prepared by the emulsion polymerization is described as follows: For example, the latex is coagulated by adding (i) an alkaline-earth metal salt such as calcium chloride, magnesium chloride, or magnesium sulfate; (ii) an alkaline metal salt such as sodium chloride, or sodium sulfate; (iii) an inorganic acid such as hydrochloric acid, sulfuric acid, or phosphoric acid; and (iv) an organic acid such as acetic acid, to the latex, followed by dehydrating and drying. Freeze drying and spray drying may also be used.

The resulting polyorganosiloxane-containing graft copolymer (D) is blended with the rubber-modified styrene resin (E) to provide a resin composition having excellent impact resistance.

The rubber-modified styrene resins (E) include, for example, high-impact polystyrene (HIPS), an ABS resin composed of a styrene-butadiene-acrylonitrile copolymer, a heat-resistant ABS resin in which $\alpha$-methylstyrene or maleimide partially or substantially substitutes for styrene in the ABS resin, and a (heat-resistant) AES resin or (heat-resistant) AAS resin, in which an ethylene-propylene rubber or poly(butyl acrylate) substitutes for the butadiene in the ABS resin. These rubber-modified styrene resins may be used alone or in combination. A combination of the rubber-modified styrene resin (E) and at least one, for example, polycarbonate, polyamide, poly(butylene terephtalate), and poly(ethylene terephtalate) may also be used.

The amount of the polyorganosiloxane-containing graft copolymer (D) blended into the rubber-modified styrene resin (E) is 0.1 to 3 percent by weight relative to 99.9 to 97 percent by weight of the rubber-modified styrene resin and preferably 0.1 to 0.9 percent by weight relative to 99.9 to 99.1 percent by weight in view of the impact resistance and the moldability. In the case of less than 0.1 percent by weight of the polyorganosiloxane-containing graft copolymer (D), the effect of improving the impact resistance of a complete molded product tends to decrease, while in the case of more than 3 percent by weight, the moldability tends to decrease, in other words, a problem arises in that, for example, black-colored lines occur on the surface of the molded product.

The resin composition may be prepared by mixing the polyorganosiloxane-containing graft copolymer (D) and the rubber-modified styrene resin (E) with, for example, a Henschel mixer or a ribbon blender and then further mixing with, for example, a roller mill, a single-screw extruder, a twin-screw extruder, or a kneader.

The resin composition may contain typical additives, for example, a pigment, a colorant, a heat stabilizer, an antioxidant, a plasticizer, a lubricant, an ultraviolet absorber, a light stabilizer, and an antistatic agent.

Methods for molding the resulting high-impact resin composition include molding methods of general thermoplastic resin compositions, for example, injection molding, extrusion, blow molding, and calendaring.

EXAMPLES

The present invention will now be specifically described in further detail based on examples, however, the present invention is not limited to these examples.

Methods for evaluating the examples and comparative examples are summarized below.

[Polymerization Conversion Rate]

A latex was dried at a temperature of 120° C. for an hour with a hot-blast dryer, to determine a solid content. Polymerization conversion rate was given by the following equation: ((solid content)/(amount of fed monomer))×100(%).

[Volume Average Particle Size]

The volume average particle size of particles of a polyorganosiloxane was measured in the form of the latex. The volume average particle size (μm) was measured by a light scattering method with Microtrac UPA (manufactured by Leeds & Northup Instruments Co.).

[Powder Properties]

The latex of the polyorganosiloxane-containing graft copolymer was coagulated and dehydrated, followed by drying, thus resulting in the graft copolymer in the form of powder. The conditions of the resulting powders were evaluated according to the evaluation criteria described below.

A: Excellent powder without a sticky surface was produced.
B: Powder with a sticky surface was produced.
C: Powder was not produced because of the formation of a large block.

[Impact Resistance]

The pellets of the resin composition were molded with an injection molding machine (FAS-75D manufactured by FANUC LTD) at a cylinder temperature of 240° C. to form specimens each having a ¼ inch-bar shape (127×12.7×6.35 (thickness) mm). The notched Izod impact strength (unit: J/m) of the specimens was measured at a temperature of 23° C. according to ASTM D256.

[Tensile Strength]

The pellets of the resin composition were molded with the injection molding machine (FAS-75D manufactured by FANUC LTD) at a cylinder temperature of 240° C. to form specimens each having an ASTM type-1 dumbbell shape with a thickness of 3 mm in accordance with ASTM D638. The tensile strength (unit: MPa) of the specimens was measured at a temperature of 23° C. with an Autograph (DSS-2000 manufactured by SHIMADZU CORPORATION) with a crosshead speed 10 mm/s according to ASTM D638.

[Moldability]

The pellets of the resin composition were molded with the injection molding machine (FAS-100B manufactured by FANUC LTD) at a cylinder temperature of 240° C. to successively form 20 specimens each having a flat plate shape (100× 150 mm, thickness: 2 mm). The surfaces of the resulting specimens were evaluated by a visual inspection according to the evaluation criteria described below.

A: No unsatisfactory surfaces (the occurrence of black-colored lines) were observed in all 20 specimens.

B: An unsatisfactory surface with black-colored lines was observed in at least one specimen.

(A) Preperation of Polyorganosiloxane-Containing Graft Copolymer

Preperation Example 1

Preparation of Polyorganosiloxane-Containing Graft Copolymer (D-1)

An emulsion prepared by stirring the mixture of 300 parts by weight of pure water, 99.8 parts by weight of octamethylcyclotetrasiloxane, 0.2 parts by weight of 3-mercaptopropyldimethoxymethylsilane, and 0.5 parts by weight (solid content) of sodium dodecylbenzene sulfonate with a homomixer (MODEL M manufactured by Tokushu Kika Kogyo Co., Ltd.) at a speed of 7000 rpm for 5 min was introduced, in a single operation, to a reactor equipped with a stirrer, a reflux condenser, an inlet for introducing nitrogen gas, an inlet for introducing additional monomers, and a thermometer.

Next, 1.5 parts by weight of dodecylbenzenesulfonic acid as in 10 wt % aqueous solution was added, and then the temperature was increased to 80° C. with stirring under nitrogen flow. The mixture was stirred at 80° C. for 10 hours, and then the mixture was cooled to 23° C. and left for 20 hours. After that, by adding an aqueous solution of sodium hydroxide, the pH of the resulting latex was adjusted to 6.5 to finish polymerization, thus resulting in a polyorganosiloxane (A-1) latex. The resulting polyorganosiloxane (A-1) latex had a volume average particle size of 0.19 μm.

Subsequently, 250 parts by weight of pure water and 89 parts by weight (solid content basis) of the resulting polyorganosiloxane (A-1) latex was introduced into a reactor equipped with a stirrer, a reflux condenser, an inlet for introducing nitrogen gas, an inlet for introducing additional monomers, and a thermometer, and then the temperature was increased to 60° C. with stirring under nitrogen flow. After the temperature reached 60° C., 0.2 parts by weight of sodium formaldehyde sulfoxylate, 0.01 parts by weight of disodium ethylenediaminetetraacetate, and 0.0025 parts by weight of ferrous sulfate (heptahydrate) were added, and then the mixture of one part by weight of allyl methacrylate and 0.01 parts by weight of cumene hydroperoxide was added in a single operation, followed by stirring at 60° C. for an hour. After that, the mixture of 2.5 parts by weight of acrylonitrile, 7.5 parts by weight of styrene, and 0.01 parts by weight of cumene hydroperoxide was added dropwise over a period of an hour, then the resulting mixture was stirred for an hour to produce a graft copolymer (D-1) latex with 99% of polymerization conversion rate.

By adding four parts by weight of calcium chloride as in 5 wt % aqueous solution to the resulting latex, the slurry was coagulated. The resulting coagulated slurry was heated to 95° C. and cooled to 50° C., followed by dehydrating and drying, to produce a polyorganosiloxane-containing graft copolymer (D-1) in the form of powder.

Preperation Examples 2 to 14

Polyorganosiloxane-Containing Graft Copolymers (D-2) to (D-14)

As shown in Table 1, a polyorganosiloxane latex (A-2) through (A-8) were prepared as in Preparation Example 1, but the ratios of the 3-mercaptopropyldimethoxymethylsilane to the organosiloxane in preparing the polyorganosiloxane were changed, and the amount of the sodium dodecylbenzene sulfonate were also changed.

As shown in Table 2, polyorganosiloxane-containing graft copolymers (D-2) through (D-14) in the form of powder were prepared as in Preparation Example 1, but the composition of the polyorganosiloxane (A), the allyl methacrylate (B), the vinyl monomer (C) was changed.

Preperation Example 15

Polyorganosiloxane-Containing Graft Copolymer (D-15)

As shown in Table 1, a polyorganosiloxane latex (A-9) was prepared as in Preparation Example 1, but the graft-linking agent in preparing the polyorganosiloxane was changed from 3-mercaptopropyldimethoxymethylsilane to 3-methacryloxypropylmethyldimethoxysilane.

As shown in Table 2, a polyorganosiloxane-containing graft copolymer (D-15) was prepared as in Preparation Example 1, but with the resulting polyorganosiloxane latex (A-9).

Table 1 shows the compositions and the volume average particle sizes of those polyorganosiloxanes (A-1) through (A-9).

Table 2 shows the compositions and the polymerization conversion rate, and the powder conditions of the polyorganosiloxane-containing graft copolymers (D-1) through (D-15).

TABLE 1

| | | COMPOSITION OF POLYORGANOSILOXANE | | | | | | | | |
|---|---|---|---|---|---|---|---|---|---|---|
| | | A-1 | A-2 | A-3 | A-4 | A-5 | A-6 | A-7 | A-8 | A-9 |
| ORGANOSILOXANE | | 99.8 | 95 | 99.8 | 99.85 | 99.7 | 100 | 99.5 | 98.5 | 99.8 |
| GRAFT-LINKING AGENT | 3-MERCAPTOPROPYLDIMETHOXYMETHYLSILANE | 0.2 | 5 | 0.2 | 0.15 | 0.3 | 0 | 0.5 | 1.5 | |
| | 3-METHACRYLOXYPROPYLMETHYLDIMETHOXYSILANE | | | | | | | | | 0.2 |
| SODIUM DODECYLBENZENE SULFONATE | | 0.5 | 0.5 | 2.0 | 2.0 | 2.0 | 2.0 | 2.0 | 2.0 | 2.0 |
| VOLUME AVERAGE PARTICLE SIZE (μm) | | 0.19 | 0.19 | 0.14 | 0.14 | 0.14 | 0.14 | 0.14 | 0.14 | 0.15 |

TABLE 2

| | | D-1 | D-2 | D-3 | D-4 | D-5 | D-6 | D-7 | D-8 | D-9 | D-10 | D-11 | D-12 | D-13 | D-14 | D-15 |
|---|---|---|---|---|---|---|---|---|---|---|---|---|---|---|---|---|
| (A) | POLYORGANO-SILOXANE (A-1) | 89 | 87 | 80 | 90 | 35 | | | | | | | | | | |
| | POLYORGANO-SILOXANE (A-2) | | | | | | 87 | | | | | | | | | |
| | POLYORGANO-SILOXANE (A-3) | | | | | | | 85 | | | | | | 70 | 90 | |
| | POLYORGANO-SILOXANE (A-4) | | | | | | | | 75 | | | | | | | |
| | POLYORGANO-SILOXANE (A-5) | | | | | | | | | 80 | | | | | | |
| | POLYORGANO-SILOXANE (A-6) | | | | | | | | | | | 85 | | | | |
| | POLYORGANO-SILOXANE (A-7) | | | | | | | | | | 85 | | | | | |
| | POLYORGANO-SILOXANE (A-8) | | | | | | | | | | | | 35 | | | |
| | POLYORGANO-SILOXANE (A-9) | | | | | | | | | | | | | | | 85 |
| (B) | ALLYL METHACRYLATE | 1 | 3 | 10 | 0 | 0 | 3 | 0 | 0 | 0 | 0 | 0 | 0 | 0 | 0 | 0 |
| (C) | ACRYLONITRILE | 2.5 | 2.5 | 2.5 | 2.5 | 16.5 | 2.5 | 3.8 | 6.3 | 5 | 3.8 | 3.8 | 16.3 | 7.5 | 2.5 | 3.8 |
| | STYRENE | 7.5 | 7.5 | 7.5 | 7.5 | 51.5 | 7.5 | 11.2 | 18.7 | 15 | 11.2 | 11.2 | 48.7 | 22.5 | 7.5 | 11.2 |
| | CUMENE HYDROPEROXIDE | 0.01 | 0.01 | 0.01 | 0.01 | 0.04 | 0.01 | 0.02 | 0.03 | 0.03 | 0.03 | 0.03 | 0.07 | 0.03 | 0.01 | 0.02 |
| POLYMERIZATION CONVERSION RATE (%) | | 99 | 99 | 99 | 99 | 98 | 99 | 99 | 99 | 99 | 99 | 99 | 99 | 99 | 98 | 99 |
| POWDER PROPERTY | | B | A | A | C | A | A | A | A | A | B | A | A | A | C | A |

(B) Preperation of Rubber-Modified Styrene Resin

Preperation Example 16

Preparation of Rubber-Modified Styrenic Resin (E-1)

To a reactor equipped with a stirrer, a reflux condenser, an inlet for introducing nitrogen gas, an inlet for introducing additional monomers, and a thermometer were introduced 200 parts by weight of pure water and 0.7 parts by weight (solid content) of sodium palmitate. The temperature was increased to 45° C. with stirring under nitrogen flow, and then 0.3 parts by weight of sodium formaldehyde sulfoxylate, 0.01 parts by weight of disodium ethylenediaminetetraacetate, and 0.0025 parts by weight of ferrous sulfate (heptahydrate) were added. In the first step, the mixture of the monomers, that is, 75 parts by weight of butyl acrylate, 0.3 parts by weight of triallyl cyanurate, and 0.037 parts by weight of cumene hydroperoxide, was successively added dropwise over a period of six hours, then the resulting mixture was stirred at 45° C. for an hour. During this dropwise addition, 0.25 parts by weight (solid content) of sodium palmitate was each added at 1.5 and 3 hours after starting the dropwise addition. In the second step, the mixture of the monomers, that is, 25 parts by weight of butyl acrylate, 0.4 parts by weight of triallyl cyanurate, and 0.013 parts by weight of cumene hydroperoxide, was successively added dropwise over a period of three hours, then the resulting mixture was stirred at 45° C. for an hour to finish the polymerization. The polymerization conversion rate was 99%. The volume average particle size of the prepared acrylic rubber polymer latex was 0.092 μm.

Subsequently, 250 parts by weight of pure water and 50 parts by weight (solid content basis) of the acrylic rubber polymer latex described above were introduced into a reactor equipped with a stirrer, a reflux condenser, an inlet for introducing nitrogen gas, an inlet for introducing additional monomers, and a thermometer, and the temperature was increased to 65° C. with stirring under nitrogen flow, then 0.3 parts by weight (solid content) of sodium palmitate, 0.2 parts by weight of sodium formaldehyde sulfoxylate, 0.01 parts by weight of disodium ethylenediaminetetraacetate, and 0.0025 parts by weight of ferrous sulfate (heptahydrate) were added. The mixture of 12 parts by weight of acrylonitrile, 38 parts by weight of styrene, and 0.3 parts by weight of cumene hydroperoxide, was successively added dropwise over a period of five hours, followed by stirring at 65° C. for two hours to finish the polymerization, thus resulting in the latex of an acrylic-rubber-containing graft copolymer (e-1). The polymerization conversion rate was 98%.

To a reactor equipped with a stirrer, a reflux condenser, an inlet for introducing nitrogen gas, an inlet for introducing additional monomers, and a thermometer were introduced 250 parts by weight of pure water and 0.5 parts by weight (solid content) of sodium palmitate, and the temperature was increased to 70° C. with stirring under nitrogen flow. After the temperature reached 70° C., 0.4 parts by weight of sodium formaldehyde sulfoxylate, 0.01 parts by weight of disodium ethylenediaminetetraacetate, and 0.0025 parts by weight of ferrous sulfate (heptahydrate) were added, and then the mixture of 28 parts by weight of acrylonitrile, 72 parts by weight of styrene, 0.2 parts by weight of cumene hydroperoxide, and 0.3 parts by weight of t-dodecyl mercaptan, was successively added dropwise over a period of eight hours. During this dropwise addition, 0.5 parts by weight (solid content) of sodium palmitate was each added at 1.5 and 3 hours after starting the dropwise addition. After finishing the dropwise addition, the resulting mixture was stirred at 70° C. for two hours, to finish the polymerization, thus resulting in a polymer (e-2) latex. The polymerization conversion rate was 98%.

The resulting latex of the acrylic-rubber-containing graft copolymer (e-1) and the polymer (e-2) latex were blended at the ratio of 60:40 by weight, and then three parts by weight of calcium chloride as in 5 wt % aqueous solution was added, to coagulate the slurry. The resulting coagulated slurry was heated to 95° C. and cooled to 50° C., followed by dehydrating and drying, thus resulting in a rubber-modified styrene resin (E-1).

Preperation Example 17

Rubber-Modified Styrene Resin (E-2)

To a pressure-resistant reactor having a capacity of 100 liters was introduced 200 parts by weight of pure water. The reactor was evacuated, and nitrogen was introduced into the reactor, and then 100 parts by weight of butadiene, 0.3 parts by weight of potassium rosinate, 0.1 parts by weight of sodium rosinate, 0.05 parts by weight of sodium carbonate, and 0.2 parts by weight of potassium persulfate were introduced. The temperature was increased to 60° C. to initiate polymerization. The polymerization was performed for 30 hours. The resulting latex of the diene rubber polymer had a volume average particle size of 0.2312 µm. The polymerization conversion rate was 95%.

Subsequently, 250 parts by weight of pure water and 70 parts by weight (solid content) of the latex of the diene rubber polymer described above were introduced into a reactor equipped with a stirrer, a reflux condenser, an inlet for introducing nitrogen gas, an inlet for introducing additional monomers, and a thermometer, and the temperature was increased to 65° C. with stirring under nitrogen flow. After 0.2 parts by weight of sodium formaldehyde sulfoxylate, 0.01 parts by weight of disodium ethylenediaminetetraacetate, and 0.0025 parts by weight ferrous sulfate (heptahydrate) were added, the mixture of eight parts by weight of acrylonitrile, 22 parts by weight of styrene, and 0.3 parts by weight cumene hydroperoxide, was successively added dropwise over a period of five hours, followed by stirring at 65° C. for two hours, to finish the polymerization, thus resulting in the latex of a diene-rubber-containing graft copolymer (e-3). The polymerization conversion rate was 98%.

The resulting latex of the diene-rubber-containing graft copolymer (e-3) and the polymer (e-2) latex prepared in Preparation Example 7 were blended at the ratio of 20:80 by weight. After 0.5 parts by weight of a phenolic antioxidant (AO-50 manufactured by ASAHI DENKA CO., LTD.) was added, three parts by weight of calcium chloride as in 5wt % aqueous solution was added, to coagulate the slurry. The coagulated slurry was heated to 95° C. and cooled to 50° C., followed by dehydrating and drying, thus resulting in a rubber-modified styrene resin (E-2) in the form of powder.

Example 1

With a henschel mixer (SMV-20 manufactured by KAWATA MFC Co., Ltd.), 99.7 parts by weight of the rubber-modified styrene resin (E-1), 0.3 parts by weight of the polyorganosiloxane-containing graft copolymer (D-1), one part by weight of ethylene bis(stearamide), and 0.2 parts by weight of the phenolic antioxidant (AO-20 manufactured by ASAHI DENKA CO., LTD.) were blended for five minutes. Furthermore, the resulting mixture was melted and mixed with a vented single-screw extruder (HV-40-28 manufactured by TABATA industrial Machinery Co., Ltd) at a cylinder temperature of 230° C., to produce pellets of the resin composition. The resulting pellets were molded with an injection molding machine (FAS-75D manufactured by FANUC LTD) at a cylinder temperature of 240° C. to form specimens. Then physical properties were evaluated. Table 3 shows the results.

Examples 2 to 10

As shown in Table 3, pellets were produced as in Example 1, but the composition of the polyorganosiloxane-containing graft copolymers and the rubber-modified styrene resins was changed. And then the injection molding was performed to manufacture specimens, and the physical properties were evaluated. Table 3 shows the results.

TABLE 3

| | | | EXAMPLE | | | | | | | | | |
|---|---|---|---|---|---|---|---|---|---|---|---|---|
| | | | 1 | 2 | 3 | 4 | 5 | 6 | 7 | 8 | 9 | 10 |
| RESIN COMPOSITION | RUBBER-MODIFIED STYRENE RESIN | E-1 | 99.7 | 99.7 | 99.2 | | 99.7 | 99.7 | 99.7 | 99.7 | 97.5 | |
| | | E-2 | | | | 99.7 | | | | | | 99.7 |
| | POLYORGANOSILOXANE-CONTAINING GRAFT COPOLYMER (D) | D-1 | 0.3 | | | 0.3 | | | | | | |
| | | D-2 | | 0.3 | | | | | | | | |
| | | D-3 | | | 0.8 | | | | | | | |
| | | D-4 | | | | | | | | | | |
| | | D-5 | | | | | | | | | | |
| | | D-6 | | | | | | | | | | |
| | | D-7 | | | | | 0.3 | | | | 2.5 | 0.3 |
| | | D-8 | | | | | | 0.3 | | | | |
| | | D-9 | | | | | | | 0.3 | | | |
| | | D-10 | | | | | | | | | | |
| | | D-11 | | | | | | | | | | |
| | | D-12 | | | | | | | | | | |
| | | D-13 | | | | | | | | | | |
| | | D-14 | | | | | | | | | | |
| | | D-15 | | | | | | | | 0.3 | | |
| | SILICONE OIL | SH-200 | | | | | | | | | | |
| EVALUATION OF PHYSICAL PROPERTIES | IZOD IMPACT STRENGTH (J/m) | | 345 | 335 | 360 | 380 | 350 | 360 | 340 | 335 | 375 | 380 |
| | TENSILE STRENGTH (MPa) | | 33 | 33 | 33 | 48 | 33 | 33 | 33 | 33 | 31 | 48 |
| | MOLDABILITY | | A | A | A | A | A | A | A | A | A | A |

Comparative Examples 1 to 13

As shown in Table 4, pellets were produced as in Example 1, but the composition of the polyorganosiloxane-containing graft copolymers and the rubber-modified styrene resins was changed. And then, the injection molding was performed to manufacture specimens, and the physical properties were evaluated. Table 4 shows the results.

However, in Comparative Examples 4 and 13, the polyorganosiloxane-containing graft polymer (D) had poor powder properties as shown in Table 2. Hence, pellets and specimens were hardly produced by the standard method. To evaluate the physical properties, the samples were processed to powder form, followed by palletizing.

small amount of the copolymer has excellent impact resistance, high tensile strength, and good moldability.

INDUSTRIAL APPLICABILITY

A resin composition prepared by blending the rubber-modified styrene resin and a small amount of the polyorganosiloxane-containing graft copolymer with a specific composition according to the present invention may be applied to housings and components used for office automation equip-

TABLE 4

| | | | COMPARATIVE EXAMPLE | | | | | | | | | | | | | |
|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| RESIN COMPO- SITION | RUBBER- MODIFIED STYRENE RESIN | E-1 | 100 | | 99.7 | 99.7 | 99.7 | 95 | 99.7 | 96 | 99.7 | 99.7 | 99.7 | 99.7 | 99.7 | 99.7 | 99.2 |
| | | E-2 | | 100 | | | | | | | | | | | | | |
| | POLY- ORGANO- SILOXANE- CONTAINING GRAFT COPOLYMER (D) | D-1 | | | | | | | | | | | | | | | |
| | | D-2 | | | | | | 5 | | | | | | | | | |
| | | D-3 | | | 0.3 | | | | | | | | | | | | |
| | | D-4 | | | | 0.3 | | | | | | | | | | | |
| | | D-5 | | | | | 0.3 | | | | | | | | | | |
| | | D-6 | | | | | | | 0.3 | | | | | | | | |
| | | D-7 | | | | | | | | 4 | | | | | | | |
| | | D-8 | | | | | | | | | | | | | | | |
| | | D-9 | | | | | | | | | | | | | | | |
| | | D-10 | | | | | | | | | | 0.3 | | | | | |
| | | D-11 | | | | | | | | | | | 0.3 | | | | |
| | | D-12 | | | | | | | | | | | | 0.3 | | | |
| | | D-13 | | | | | | | | | | | | | 0.3 | | |
| | | D-14 | | | | | | | | | | | | | | 0.3 | |
| | | D-15 | | | | | | | | | | | | | | | |
| | SILICONE OIL | SH- 200 | | | | | | | | | | | | | | 0.3 | 0.8 |
| EVALU- ATION OF PHYSICAL PROPERTIES | IZOD IMPACT STRENGTH (J/m) | | 130 | 160 | 150 | 330 | 150 | 350 | 150 | 380 | 200 | 250 | 150 | 250 | 320 | 200 | 300 |
| | TENSILE STRENGTH (MPa) | | 33 | 48 | 33 | 33 | 32 | 28 | 33 | 29 | 30 | 32 | 33 | 33 | 33 | 33 | 32 |
| | MOLDABILITY | | A | A | A | A | A | B | A | B | A | A | A | A | A | A | B |

Comparative Example 14

As shown in Table 4, pellets were produced as in Example 1, but 0.3 parts by weight of a silicone oil (SH-200 manufactured by Dow Corning Toray Silicone Co., Ltd. (viscosity: 10000 cST)) substituted for the polyorganosiloxane-containing graft copolymer (D-1). And then, specimens were manufactured by injection molding, and the physical properties were evaluated. Table 4 shows the results.

Comparative Example 15

Pellets were produced as in Comparative Example 14, but the resin composition was changed to the following: 99.2 parts by weight of the rubber-modified styrene resin (E-1) and 0.8 parts by weight of the silicone oil. And then, specimens were manufactured by injection molding, and the physical properties were evaluated. Table 4 shows the results.

The polyorganosiloxane-containing graft copolymer of the present invention has excellent powder properties. The molded product manufactured with the resin composition prepared by blending the rubber-modified styrene resin and a ment such as game machines, telephones, cellular phones, notebook personal computers, desktop computers, printers, copiers, and facsimiles; and household electrical appliances such as electric refrigerators, room air conditioners, electric washing machines, and vacuum cleaners. It also may be applied to automotive interior components such as registers, console boxes, pillars, center panels, meter panels, control switch panels, and column covers; and automotive exterior components such as grilles, wheel caps, wheel covers, exterior pillars, center pillars, lamp housings, and housings of side mirrors.

The invention claimed is:

1. A rubber-modified styrene resin composition comprising 99.9 to 97 percent by weight of a rubber-modified styrene resin (E) and 0.1 to 3 percent by weight of a polyorganosiloxane-containing graft copolymer (D), the polyorganosiloxane-containing graft copolymer (D) being a copolymer (a-1) that is prepared with a polyorganosiloxane (A), wherein the polyorganosiloxane (A) being produced by polymerizing 99.9 to 99.6 percent by weight of an organosiloxane and 0.1 to 0.4 percent by weight of a graft-linking agent, wherein the copolymer (a-1) being prepared by polymerizing, in the presence of 86 to 94.99 parts by weight of the polyorganosiloxane (A), 0.01 to 5 parts by weight of a monomer (B), and then polymerizing the resulting polymer with 5 to 13.99 parts by weight of a vinyl monomer (C), to thereby provide a copolymer (a-1) consisting essentially of 86 to 94.99 parts by weight of polyorganosiloxane (A), 0.01 to 5 parts by weight of a monomer (B), and 5 to 13.99 parts by weight of a vinyl monomer (C); and the monomer (B) consisting of 100 to 50 percent by weight of a polyfunctional monomer (b-1) having at least two polymerizable unsaturated bonds in its molecule and 0 to 50 percent by weight of another copolymerizable monomer (b-2);

wherein the sum of the compounds (A), (B), and (C) is 100 parts by weight per 100 parts of the graft copolymer.

2. The rubber-modified styrene resin composition according to claim 1, wherein the rubber-modified styrene resin comprises 99.9 to 99.1 percent by weight of the rubber-modified styrene resin (E) and 0.1 to 0.9 percent by weight of the polyorganosiloxane-containing graft copolymer (D).

3. The rubber-modified styrene resin composition according to claim 1, wherein each of the vinyl monomers (b-2) and (C) is at least one selected from the group of an aromatic vinyl monomer, a cyanovinyl monomer, a (meth)acrylate monomer, a vinyl monomer with a carboxyl group, and a maleimide monomer, the vinyl monomers (b-2) and (C) being used in preparing the polyorganosiloxane-containing graft copolymer (D).

* * * * *